United States Patent [19]

Herzl

[11] Patent Number: 4,691,578

[45] Date of Patent: Sep. 8, 1987

[54] CORIOLIS-TYPE MASS FLOWMETER

[75] Inventor: Peter J. Herzl, Morrisville, Pa.

[73] Assignee: Fischer & Porter Company, Warminster, Pa.

[21] Appl. No.: 831,564

[22] Filed: Feb. 21, 1986

[51] Int. Cl.$^4$ .............................................. G01F 1/84
[52] U.S. Cl. .................................................. 73/861.38
[58] Field of Search ...................................... 73/861.38

[56] References Cited

U.S. PATENT DOCUMENTS

| | | | |
|---|---|---|---|
| 3,485,098 | 12/1969 | Sipin | 73/861.38 |
| 4,127,028 | 11/1978 | Cox et al. | 73/861.38 |
| 4,187,721 | 2/1980 | Smith | 73/861.38 |
| 4,252,028 | 2/1981 | Smith et al. | 73/861.38 |

FOREIGN PATENT DOCUMENTS

| | | | |
|---|---|---|---|
| 8505677 | 12/1985 | PCT Int'l Appl. | 73/861.38 |
| 0732672 | 5/1980 | U.S.S.R. | 73/861.38 |

*Primary Examiner*—Herbert Goldstein
*Attorney, Agent, or Firm*—Michael Ebert

[57] ABSTRACT

A mass flowmeter of the Coriolis-type in which the fluid to be metered is conducted through a loop supported on a stationary frame, the loop having a natural resonance frequency. Mounted at the vertex of the loop is a ballistic vibrator which is electrically energized to cause the loop to vibrate at its natural frequency on either side of its static plane. The fluid passing through the loop is subjected to Coriolis forces, causing the vibrating loop to torsionally oscillate in accordance with the mass flow rate of the fluid. This torsional oscillation is sensed by a pair of strain gauge transducers mounted in balanced relation on opposite legs of the loop, whereby the signals yielded by the transducers have a difference in magnitude therebetween that depends on the amplitude of the torsional oscillation. These signals are applied to a differential amplifier whose output is proportional to the mass flow rate of the fluid.

8 Claims, 6 Drawing Figures

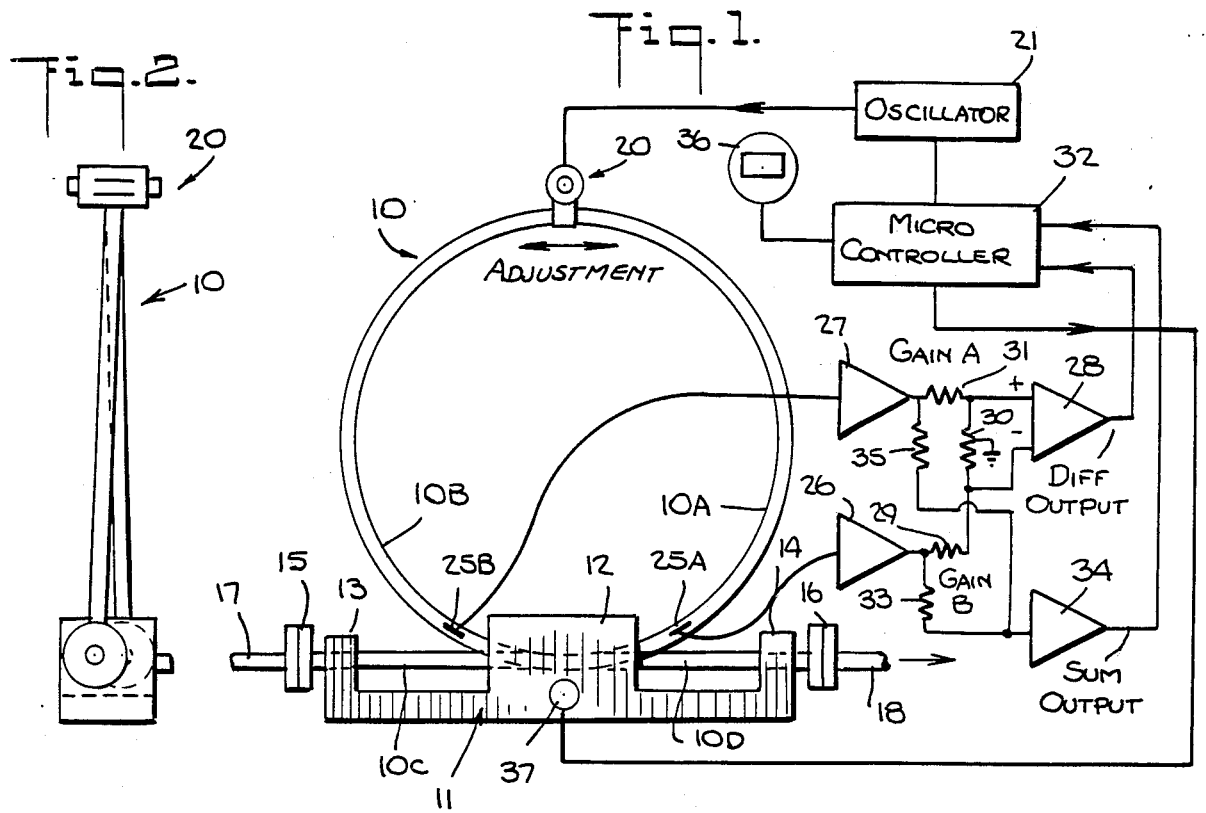
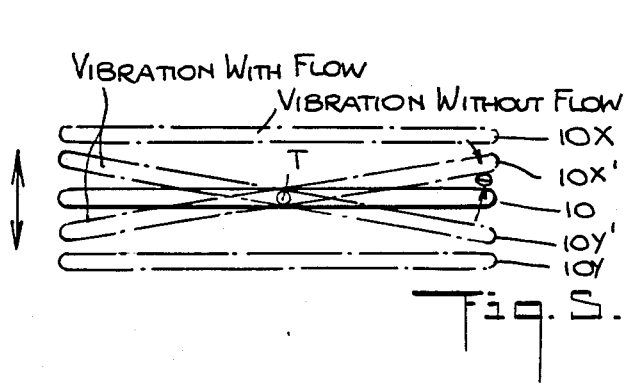
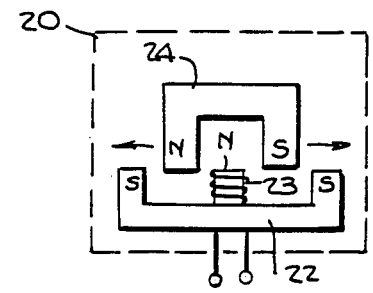
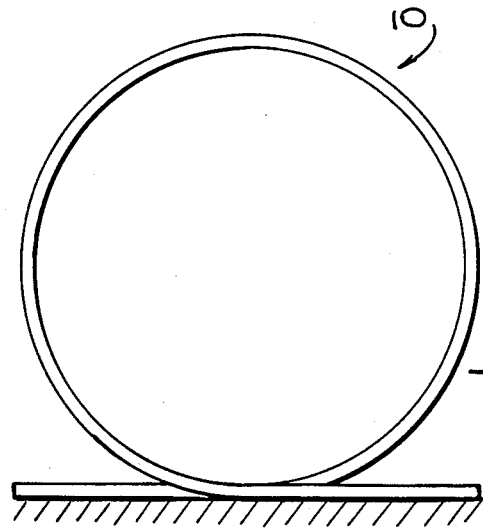
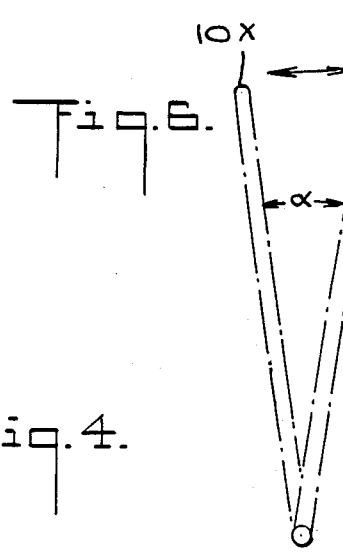

CORIOLIS-TYPE MASS FLOWMETER

BACKGROUND OF INVENTION

1. Field of Invention

This invention relates generally to mass flowmeters, and more particularly to a Coriolis-type meter of simplified construction.

2. Status of Art

A mass flow rate meter is an instrument for measuring the mass of a fluid flowing through a conduit per unit time. Most meters for this purpose measure a quantity from which the mass can be inferred, rather than measuring mass directly. Thus, one can measure the mass flow rate with a volumetric flowmeter by also taking into account pressure, temperature and other parameters to compute the mass.

A Coriolis-type mass flowmeter, which is also called a Coriolis/Gyroscopic meter, provides an output directly proportional to mass flow, thereby obviating the need to measure pressure, temperature, density and other parameters. In this type of meter, there are no obstacles in the path of the flowing fluid, and the accuracy of the instrument is unaffected by erosion, corrosion or scale build-up in the flow sensor.

The theory underlying a Coriolis-type mass flowmeter and the advantages gained thereby are spelled out in the article by K.0. Plache, "Coriolis/Gyroscopic Flow Meter" in the March 1979 issue of Mechanical Engineering, pages 36 to 39.

A Coriolis force is generally associated with a continuously rotating system. Thus, the earth's rotation causes winds from a high pressure region to spiral outwardly in a clockwise direction in the northern hemisphere, and in the counterclockwise direction in the southern hemisphere. And a person moving on a merry-go-round will experience a lateral force and must lean sideways in order to move forward when walking outward along a radius.

A Coriolis force and precession in a gyroscope arise from the same principle. In a gyroscope, when a torque is applied at right angles to the axis of rotor spin, this will produce a precessional rotation at right angles to the spin axis and to the applied torque axis. A Coriolis force involves the radial movement of mass from one point on a rotating body to a second point, as a result of which the peripheral velocity of the mass is caused to accelerate. This acceleration of the mass generates a force in the plane of rotation which is normal to the instantaneous radial movement.

In one known form of Coriolis-type mass flowmeter, the fluid to be metered flows through a C-shaped pipe which, in association with a leaf spring, act as the opposing tines of a tuning fork. This fork is electromagnetically actuated, thereby subjecting each moving particle within the pipe to a Coriolis-type acceleration. The resultant forces angularly deflect or twist the C-shaped pipe to a degree inversely proportional to the stiffness of the pipe and directly proportional to the mass flow rate within the pipe.

The twist of the pipe is electro-optically sensed twice during each cycle of tuning fork oscillation which takes place at the natural resonance frequency of the structure. The output of the optical detector is a pulse whose width is modulated as a function of the mass flow rate. This pulse width is digitized and displayed to provide a numerical indication of mass flow rate.

In the Roth Pat. No. 3,132,512, a Coriolis-type mass flowmeter is disclosed in which a flow loop vibrating at its resonance frequency is caused to oscillate about a torque axis which varies with fluid flow in the loop. This torsional oscillation is sensed by moving coil transducers.

The Cox et al. Pat. No. 4,192,184 shows a Coriolis-type meter having two U-shaped flow loops arranged to vibrate like the tines of a tuning fork, torsional oscillation of these loops in accordance with the mass of the fluid passing therethrough being sensed by light detectors. In the Smith Pat. No. 4,222,338, electromagnetic sensors provide a linear analog signal representing the oscillatory motion of a U-shaped pipe. Electromagnetic sensors are also used in Smith U.S. Pat. No. 4,491,025 in which the fluid whose mass is to be measured flows serially through two parallel U-shaped pipes which together operate as the tines of a tuning fork.

In prior art mass flowmeters of the above-described Coriolis type, the flow loops are caused to vibrate at their natural resonance frequency by an electromagnetic transducer, one element of which is mounted on the flow loop so that it is movable relative to the other element which is supported on a stationary frame or platform, the loop element being attracted or repelled by the platform element. Thus, in the above-noted Smith patents, the transducer is constituted by a coil mounted on the flow loop and a cooperating permanent magnet mounted on a fixed platform. This type of arrangement is troublesome, for unless the frame or platform is highly stable, the flow loop will not be driven at a constant amplitude, and the output of the meter will not be accurate.

The same problem exists in regard to the transducer which senses the torsional oscillation of the flow loop, for again, one element of the transducer is secured to the loop, and the other to a fixed frame.

The need for a stable frame or platform as a frame of reference for a moving element in a transducer as in prior art Coriolis-type mass flowmeters makes such meters mechanically more complex and more expensive to manufacture. Moreover, prior art systems are relatively cumbersome.

SUMMARY OF INVENTION

In view of the foregoing, the main object of this invention is to provide a Coriolis-type mass flowmeter of compact, simplified construction which operates efficiently, reliably and accurately.

More particularly, an object of this invention is to provide a mass flowmeter of the above-type which makes use of a single turn flow loop that is excited into vibration at its natural resonance frequency by a vibrating ballistic mass which is independent of a reference frame or platform.

Also, an object of this invention is to provide a mass flowmeter in which the torsional oscillation of the vibratory flow loop is sensed without reference to a stable frame or platform.

A significant advantage of the invention is that acceleration effects only act on the flow loop and not, as in prior art systems, also on the frame or platform serving as a reference for the transducers included in the system. In prior art systems, acceleration effects will remain unless the whole mechanical system is balanced, whereas no such requirement exists in a system in accordance with the invention.

Briefly stated, these objects are attained in a mass flowmeter of the Coriolis type in which the fluid to be metered is conducted through a loop supported on a stationary frame, the loop having a natural resonance frequency. Mounted at the vertex of the loop is a ballistic vibrator which is electrically energized to cause the loop to vibrate at its natural frequency on either side of its static plane. The fluid passing through the loop is subjected to Coriolis forces, causing the vibrating loop to torsionally oscillate in accordance with the mass flow rate of the fluid. This torsional oscillation is sensed by a pair of strain gauge transducers mounted in balanced relation on opposite legs of the loop, whereby the signals yielded by the transducers have a difference in magnitude therebetween that depends on the amplitude of the torsional oscillation. These signals are applied to a differential amplifier whose output is proportional to the mass flow rate of the liquid.

OUTLINE OF DRAWINGS

For a better understanding of the invention as well as other objects and further features thereof, reference is made to the following detailed description to be read in conjunction with the accompanying drawings, wherein:

FIG. 1 is a block diagram of a Coriolis-type mass flowmeter in accordance with the invention;

FIG. 2 is an end view of the flow loop assembly;

FIG. 3 is a schematic illustration of the ballistic vibrator included in the assembly;

FIG. 4 illustrates the flow loop in side view;

FIG. 5 illustrates how the flow loop vibrates with and without flow; and

FIG. 6 shows the angle made by the loop during its harmonic vibration.

DESCRIPTION OF INVENTION

Structure

Referring now to FIGS. 1 and 2, there is shown a Coriolis-type mass flowmeter in accordance with the invention which includes a single-turn flow loop 10 formed by a pipe having a pair of arcuate legs 10A and 10B. The loop is supported on a rigid stationary frame 11 provided with a midsection 12 and left and right end sections 13 and 14.

Leg 10A of the loop leads into a horizontal pipe section 10C which passes through a bore in end section 13 of the frame and terminates in a coupling flange 15. Leg 10B of the loop leads into a horizontal pipe section 10D parallel to pipe section 10C, pipe section 10D passing through a bore in end section 14 of the frame and terminating in a coupling flange 16.

Coupling flange 15 of the loop is joined to the end flange of an upstream pipe 17 of a line conveying the fluid to be metered, while coupling flange 16 of the loop is joined to the end flange of the downstream pipe 18 of the fluid line. Since the meter is bi-directional and will operate with fluid flow in either direction, in practice pipe 17 may serve as the downstream pipe, in which event pipe 18 is the upstream pipe.

Mounted at about the vertex of loop 10 by means of a releasable clamp 19 or similar means is an electromagnetic ballistic vibrator 20 energized by an oscillator 21 external to the assembly to vibrate at a frequency which corresponds to the natural resonance frequency of the loop. This causes the loop to oscillate at its resonance frequency, the loop swinging back and forth in a direction normal to the static vertical plane thereof.

As shown separately in FIG. 3, a preferred form of ballistic vibrator consists of a three-legged ferromagnetic stator 22 whose center leg has a coil 23 wound thereon, so that when an alternating voltage from oscillator 21 is applied thereto, during the positive half of each cycle, the center leg is polarized, say, North, while the end legs are both polarized South. This polarization is reversed during the negative half of the cycle.

Cooperating with the stator which is secured to the loop vertex is a movable mass constituted by a U-shaped permanent magnet 24, one of whose legs is polarized North, and the other South. The permanent magnet is free to move axially within the space defined by the end legs of the stator, one leg of the magnet lying between the center leg of the stator and the left end leg thereof, the other leg of the magnet lying between the center leg of the stator and the right end leg thereof.

With the polarization shown in FIG. 3 which exists during the positive half of each cycle, the North leg of magnet 24 is attracted toward the South left end leg of stator 22 while being repelled by the North center leg of the stator. At the same time, the South leg of the magnet is attracted to the North center leg of the stator while being repelled by the South right leg of the stator; hence, the magnet is then driven axially in the left direction. During the negative half of the cycle, the polarization of the stator legs is reversed, and the magnet is then driven in the right direction. The axis of the magnet is at right angles to the static vertical plane of the loop, and the loop is therefore caused to swing on either side of this plane when the ballistic vibrator is energized.

Mounted near the lower ends of legs 10A and 10B of the loop in balanced relation is a pair of strain gauge transducers 25A and 25B. A strain gauge is a device which senses mechanical deformation and is normally attached to the structural element being deformed. Some types of strain gauges exploit a change of electrical resistance of a wire or a silicon semiconductor under tension, the gauge converting a small mechanical motion into an electrical signal by virtue of the fact that when the wire or semiconductor is stretched, its resistance is changed. Preferably, use is made of a piezoelectric strain gauge transducer which generates a signal as a function of the strain to which the gauge is subjected.

The signal from strain gauge transducers 25A is applied to a pre-amplifier 26 and that from strain gauge transducer 25B to a pre-amplifier 27. The output of pre-amplifier 26 is connected to the negative input of a differential amplifier 28 through a fixed resistor 29 in series with a variable gain-control resistor 30. The output of pre-amplifier 27 is connected to the positive input of differential amplifier 28 through a fixed resistor 31. The output of differential amplifier 28 which represents the difference between the amplitudes of the strain gauge signals is applied to a micro-controller 32 which includes a microprocessor whose function will be later explained.

The output of pre-amplifier 26 is also applied through a fixed resistor 33 to the input of a summing amplifier 34 to which is also applied through a fixed resistor 35 the output of preamplifier 27. Hence, the output of summing amplifier 34 is the sum of the strain gauge signals, and this is applied to another input of microcontroller 32.

Microcontroller 32, on the basis of the sum and difference signal data entered therein, calculates the mass flow rate of fluid flowing through the flow loop to provide a digital value representing the mass flow rate. This is displayed on visual indicator 36.

Frame 11 is heavy in relation to loop 10, so that very little of the loop vibration is transmitted to frame 11. To minimize frame vibration, the frame could be attached to an external supporting member. However, in large meters where frame vibration may be troublesome, a ballistic vibrator 37 is attached to the midsection 12 of the frame, and this vibrator is energized by a-c power supplied thereto by microcontroller 32 so that vibrator 37 is energized at the same frequency as the loop resonance frequency, but out of phase therewith so as to dampen the vibration of the frame.

Operation

We shall first consider the behavior of the meter at zero flow when ballistic vibrator 20 is powered to cause loop 10 to vibrate at its resonance frequency. As a consequence, loop 10, which is shown in its static vertical solid lines in FIGS. 4 and 5, then swings back and forth, so that the loop first occupies the position shown by dashed line loop 10X on one side of the static plane, and by dashed line loop 10Y on the other side. At zero flow, strain gauge transducers 25A and 27B should ideally yield the same output, and if the respective gains of pre-amplifiers 26 and 27 are the same, then the output of differential amplifier 28 should be zero for incoming sensor signals of equal value.

In the event the strain gauge transducers are slightly mismatched, or the loop slightly unbalanced, one can adjust the position of ballistic vibrator 20 on the loop and/or make a fine adjustment in the output of pre-amplifier 26 by varying resistor 30 so that the output of differential amplifier 28 is zero at no flow.

It is important to recognize that acceleration acts equally on both sensors 25A and 25B and therefore shows up as common mode to produce no output in differential amplifier 28.

The output of summing amplifier 34 is proportional to angle $\alpha$ (see FIG. 6), which depends on the amplitude of the resonance frequency vibration of the loop. Since this amplitude is relatively constant for a given set of density, temperature and pressure conditions, short term acceleration effects can be filtered out by using a relatively long time constant for this parameter in microcontroller 32.

When there is fluid flow in vibrating loop 10, the resultant Coriolis forces causes the loop to twist and torsionally oscillate about a torque axis T. The loop then assumes an angle $\theta$ with respect to the loop in the static plane. This is indicated in FIG. 5 by dashed line loops 10X' and 10Y'. Angle $\theta$ of this torsional oscillation is proportional to mass flow as long as the frequency of oscillator 21 and the amplitude of loop vibration remain constant.

This twisting motion changes the relative amplitudes of the signals from stress gauge sensors 25A and 25B, for it increases stress on one leg of the loop while decreasing stress on the other leg. The resultant output of differential amplifier 28 represents the difference between the stress sensor signals and is proportional to mass flow as long as the frequency of oscillator 21 and the amplitude of loop vibration remain constant.

The microprocessor in microcontroller 32 therefore acts to accept the mass flow rate signal from differential amplifier 28. It corrects this flow rate signal for the vibration angle represented by the output of summing amplifier 34 and the frequency of oscillator 21. As a consequence, the mass flow rate value yielded by microcontroller 32 is an accurate indication thereof.

While there has been shown and described a preferred embodiment of a CORIOLIS-TYPE MASS FLOWMETER in accordance with the invention, it will be appreciated that many changes and modifications may be made therein without, however, departing from the essential spirit thereof. Thus, instead of arranging loop 10, as shown in FIG. 1, so that the static plane of the loop lies parallel to the longitudinal axis of the frame 11, it may be arranged to be at right angles to this axis.

I claim:

1. A mass flowmeter of the Coriolis type comprising:
   A. a single turn flow loop formed by a pipe having a pair of arcuate legs, said loop being supported on a frame whereby the loop is free to vibrate at its natural resonance frequency;
   B. a self-sufficient electromagnetic ballistic vibrator mounted on said loop at the vertex thereof, said vibrator having a mass therein that oscillates to cause the loop to vibrate at its resonance frequency;
   C. means to feed a fluid to be metered through said vibrating loop to cause said loop to undergo torsional oscillation as a function of mass flow:
   D. a pair of strain gauges mounted on the respective legs of said loop whereby in the absence of flow, the gauges yield equal signals and during flow they yield signals of different magnitude as a function of mass flow;
   E. means to apply the signals from the gauges to a differential amplifier whose output is substantially proportional to the mass flow rate; and
   F. means responsive to the differential amplifier output to provide a mass flow rate reading.

2. A flowmeter as set forth in claim 1, wherein a frame is provided with raised left and right sections, and said loop legs lead into parallel straight pipe sections, one of which passes through a bore in the left section and terminates in a coupling flange, the other passing through a bore in the right section and terminating in a coupling flange.

3. A flowmeter as set forth in claim 1, wherein said vibrator is mounted on the loop by means of a releasable clamp whereby the vertex position of the vibrator on the loop may be changed.

4. A flowmeter as set forth in claim 1, wherein said vibrator is constituted by a stator having a winding thereon coupled to an external oscillator to polarize the stator, said stator being fixedly coupled to said loop, and a permanent magnet mass cooperating with said stator and movable with respect thereto.

5. A flowmeter as set forth in claim 1, wherein said oscillator produces an a-c power whose frequency corresponds to said resonance frequency.

6. A flowmeter as set forth in claim 1, wherein said gauges are piezoelectric transducers.

7. A flowmeter as set forth in claim 1, further including a summing amplifier connected to said gauges to provide a sum output which is the sum of the signals and proportional to the amplitude of the vibrations, and means to correct the output from the differential amplifier by the output of the summing amplifier to provide a mass flow rate reading which is independent of variations in the amplitude of vibration.

8. A flowmeter as set forth in claim 1, further including a second electromagnetic ballistic vibrator secured to said frame and provided with a movable mass that oscillates at the same frequency as the loop resonance frequency but out of phase therewith so as to dampen frame vibration.

* * * * *